United States Patent [19]
Walls et al.

[11] 3,804,378
[45] Apr. 16, 1974

[54] METHOD AND APPARATUS FOR PRODUCING AN EXPANDED POLYMER MATERIAL

[75] Inventors: Neville Walls, Bury; Peter Denzil Jones, Ormskirk, both of England

[73] Assignee: MacMillan Bloedel Containers Limited, Watford, Hertfordshire, England

[22] Filed: Dec. 16, 1971

[21] Appl. No.: 208,877

[30] Foreign Application Priority Data
Dec. 16, 1971 Great Britain.................... 59784/71

[52] U.S. Cl............... 259/7, 99/323.1, 259/DIG. 18
[51] Int. Cl......................... B01f 7/08, B01f 15/02
[58] Field of Search............. 259/9, 10, 97, 7, 5, 6, 259/DIG. 18; 23/252; 99/323.4, 323.1, 516

[56] References Cited
UNITED STATES PATENTS

| | | | |
|---|---|---|---|
| 2,622,985 | 12/1952 | Haughey | 99/323.4 |
| 3,231,387 | 1/1966 | Takuzo | 99/323.4 |
| 3,246,594 | 4/1966 | Fisher | 99/323.4 |

Primary Examiner—Robert W. Jenkins

[57] ABSTRACT

Apparatus for expanding a multiplicity of pieces of expandible polymer material wherein the pieces of unexpanded material are fed into a cylinder arranged at an angle to the horizontal and conveyed along the cylinder by a conveying screw the material being heated to cause expansion by steam or other heating fluid supplied to the cylinder by means for generating the steam or other heating fluid, the expanded material being discharged from the cylinder into a container means being provided for blowing compressed air into the container. The apparatus is formed as a unitary structure on a wheeled base so as to be transportable, the material if desired being recycled to effect a second expansion the material being subject to aeration during a period of dwell between the two stages of expansion.

8 Claims, 4 Drawing Figures

METHOD AND APPARATUS FOR PRODUCING AN EXPANDED POLYMER MATERIAL

BACKGROUND OF THE INVENTION

This invention relates to apparatus for producing an expanded thermoplastic polymer material. The invention also relates to a method for producing the expanded thermoplastic polymer material.

It has been proposed to produce discrete dunnage or cushioning packaging material by foaming or expanding normally solid thermoplastic polymers. This is essentially achieved by extruding organic thermoplastic polymer articles, pieces or "bead" which contain an "expanding agent." This latter is a low-boiling organic liquid which dissolves in, but is not a solvent for the thermoplastic polymer. Upon later heating the pieces of polymer to a temperature which is above the boiling point of the expanding agent and above the softening temperature of the polymer, the pieces of the latter are "foamed" by the pressure of the evaporating expanding agent and given a greatly increased bulk. After cooling to below the softening point of the polymer, the expanded pieces are very suitable as a cushioning material in the packaging of delicate or breakable items.

The discrete particles of expanded polymer may be of any suitable shape or of haphazard shape or may be "elongated" as described in British Patent No. 924,285.

SUMMARY OF THE INVENTION

According to the invention there is provided an apparatus for expanding a multiplicity of pieces of expandable organic polymer, comprising a hollow cylinder formed with an inlet and an outlet, a conveying screw for conveying the pieces of polymer through the cylinder from the inlet to the outlet, and means for supplying a heating fluid to the cylinder to heat it to a temperature sufficient to cause the expandable polymer to expand.

Preferably, the hollow cylinder is stationary and the conveying screw rotates. The cylinder may be thermally insulated.

The heating fluid must not be a solvent for the polymer. Advantageously, the fluid is steam e.g., at a pressure of 5 p.s.i. and a temperature of 95°C., but hot water or hot air may be used.

Desirably a metering device is used to feed expandable material to the inlet of the cylinder. The metering device may comprise a conveying screw.

The polymers which may be expanded include the expandable polymers specified in British Patent No. 934,285. The pieces of polymer may be of the shapes shown in FIGS. 1 to 8 of that Patent, or may be of any other suitable shape.

When using the present apparatus to produce pieces of expandable polymer, it is desirable to carry out two expansions. The first of these occurs when pieces of unexpanded expandable polymer are conveyed through the apparatus. The once-expanded polymers are allowed to stand for a time sufficient to permit ambient air to permeate into the cells of the expanded material, since those cells are at sub-atmospheric pressure when cooled. The once-expanded pieces are then passed a second time through the cylinder, which results in a second expansion. The second expansion is due not only to a second vaporization of the remaining expanding agent but also to thermal expansion of air in the cells of the once-expanded polymer. Instead of using the same cylinder twice, it is clear that another cylinder could be used for the second expansion. Also, a different feeding arrangement may be found desirable the second time through, in view of the increased bulk of the once-expanded material.

BRIEF DESCRIPTION OF THE DRAWING

Apparatus according to one embodiment of the invention will now be described by way of example with reference to the accompanying drawings in which.

DESCRIPTION OF THE PREFERRED EMBODIMENTS

Figure 1:
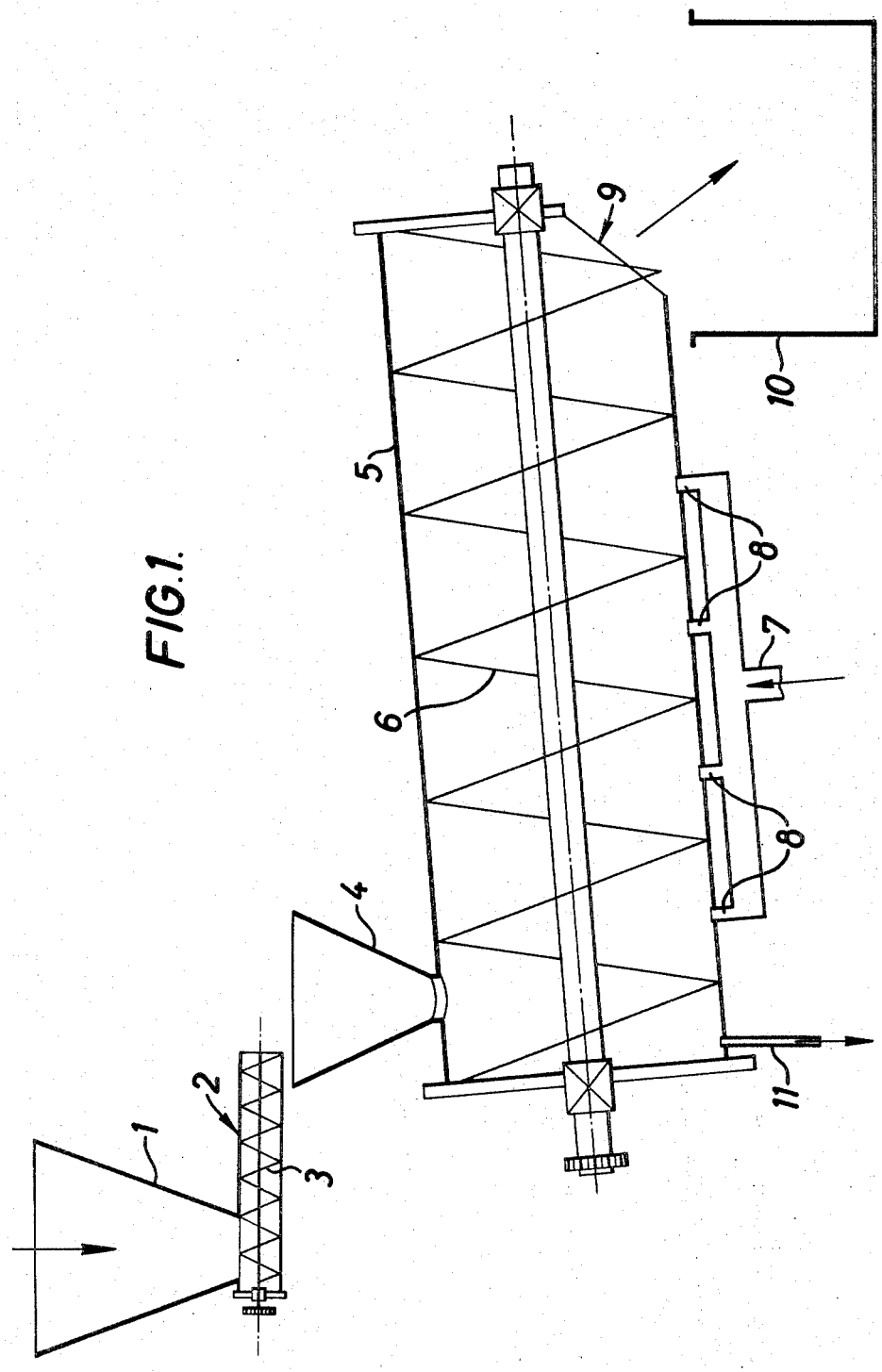
FIG. 1 is a schematic side view of the apparatus.

Referring to FIG. 1, the apparatus comprises a first hopper 1 located above the inlet of a metering device 2. The metering device comprises a conveying screw 3. A second hopper 4 is located below the outlet of the metering device 2. The bottom of the second hopper 4 leads into an opening in the adjacent or inlet end of a stationary cylinder 5 in which is a conveying screw 6. The cylinder 5 is inclined at an angle to the horizontal, with the inlet end lower than the other or discharge end. A pipe 7 for the supply of steam or other heating fluid provided with a plurality of branches 8 is attached to the cylinder 5 along the lower part of its surface. The cylinder 5 is formed in the lower half of its discharge end with an aperture 9, below which is located a receptacle 10. An outlet pipe 11 for condensate, is provided adjacent the lowermost part of the cylinder.

In operation of the apparatus, pieces of the polymer to be expanded are placed in the first hopper 1, and by means of the metering device 2 and the second hopper 4 are fed at a desired rate into the cylinder 5. Steam or other heating fluid is passed through the pipe 7 into the cylinder to heat it to a temperature sufficient for the polymer to be expanded. The pieces of polymer are conveyed along the cylinder by the screw 6. During their passage through the cylinder the pieces expand. When the expanded pieces reach the discharge end of the cylinder they fall through the aperture 9 into the receptacle 10. Condensate escapes from the cylinder through the outlet pipe 11.

It is desirable to carry out a second expansion in addition to the first expansion described above. After the first expansion, the expanded pieces are allowed to mature for a time, for example twenty hours or more. During this time, the sub-atmospheric pressure which exists within the cells of the cooled expanded material is brought up to or nearly up to atmospheric pressure by permeation of ambient air. The matured pieces are then passed a second time through the cylinder 5, which results in a second expansion. If desired, a different metering arrangement may be employed for feeding the once-expanded pieces to the cylinder.

As an alternative to using the cylinder 5 twice, it is clear that another cylinder could be used for the second expansion.

Figure 2:
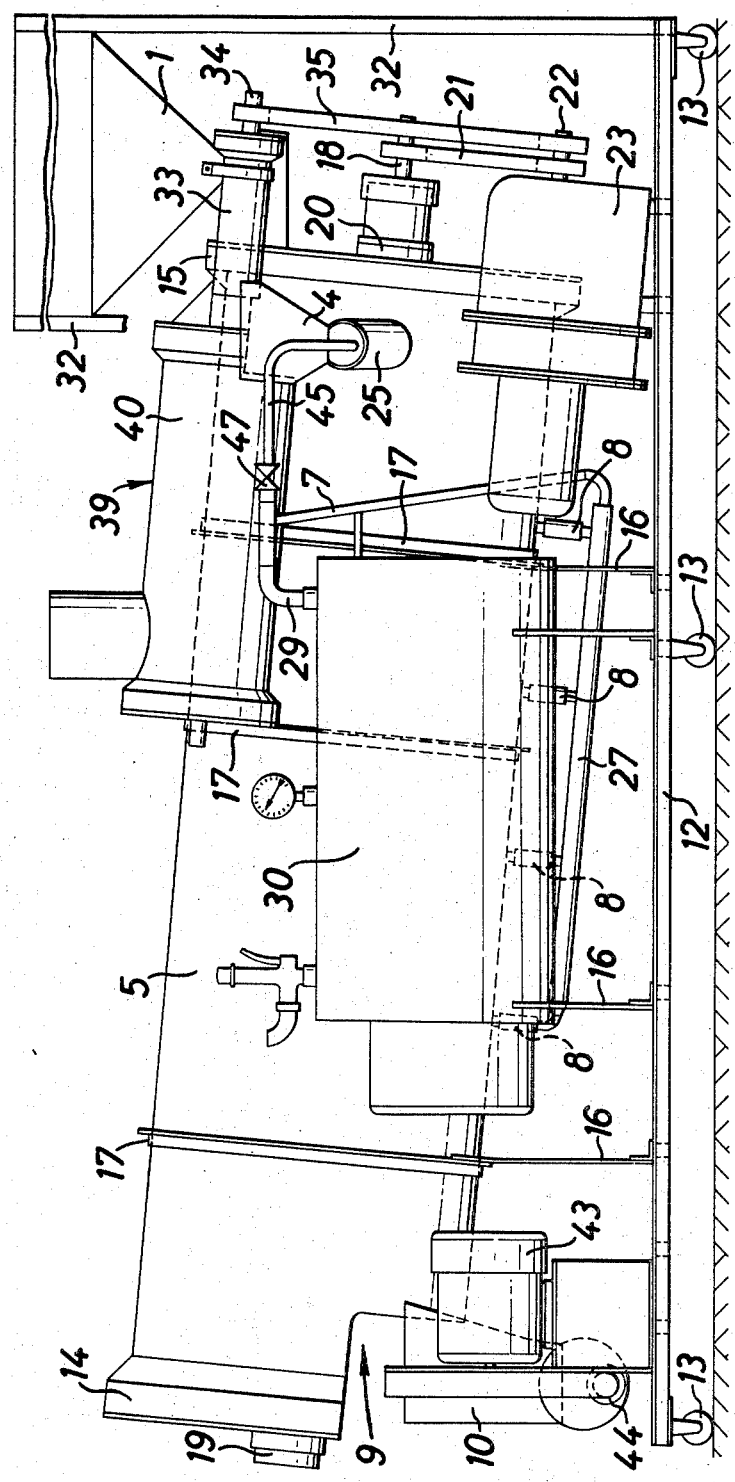
FIG. 2 is a side view of a practical construction of the apparatus shown in FIG. 1.
Figure 3:
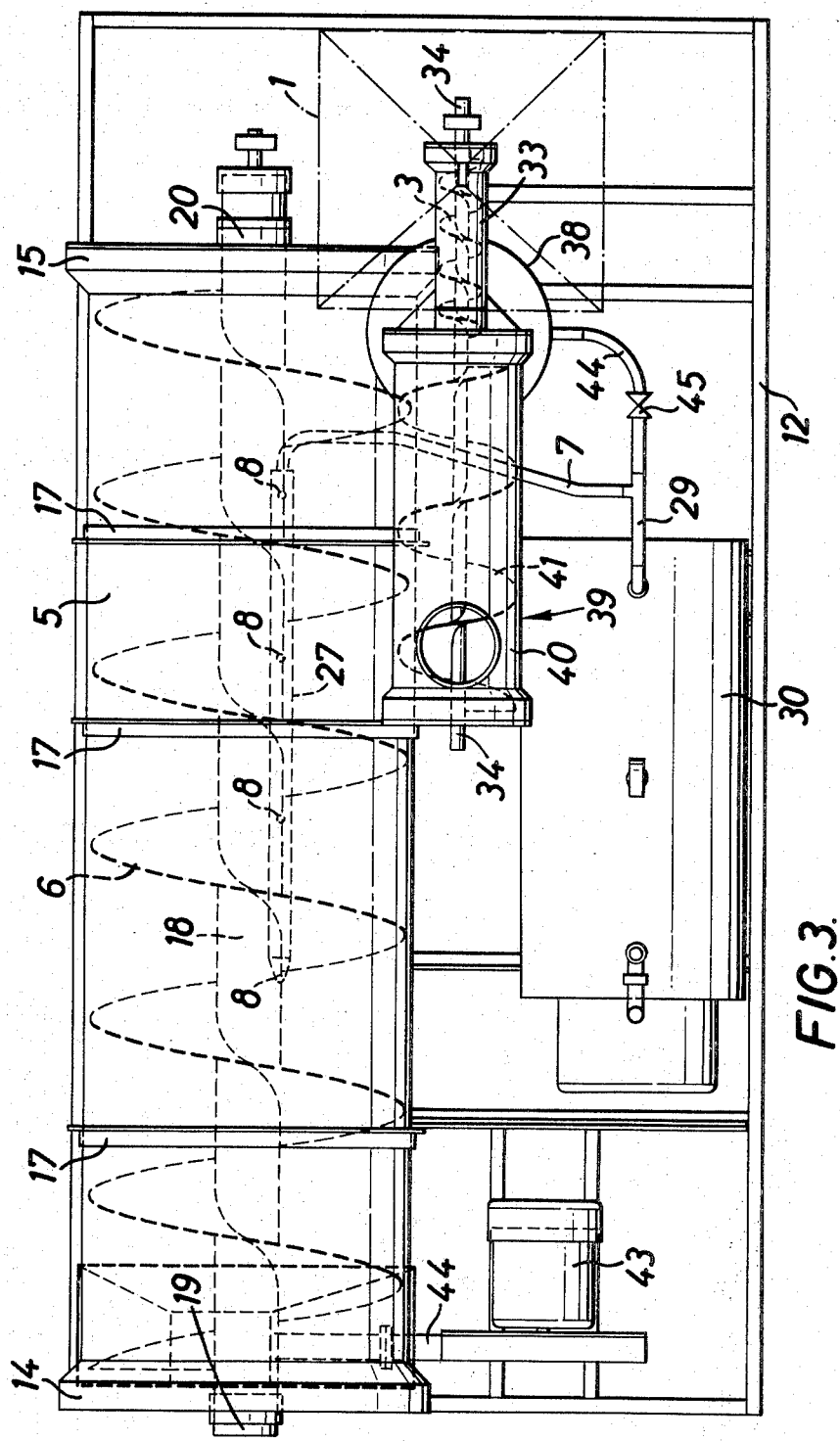
FIG. 3 is a plan view of FIG. 2.
Figure 4:
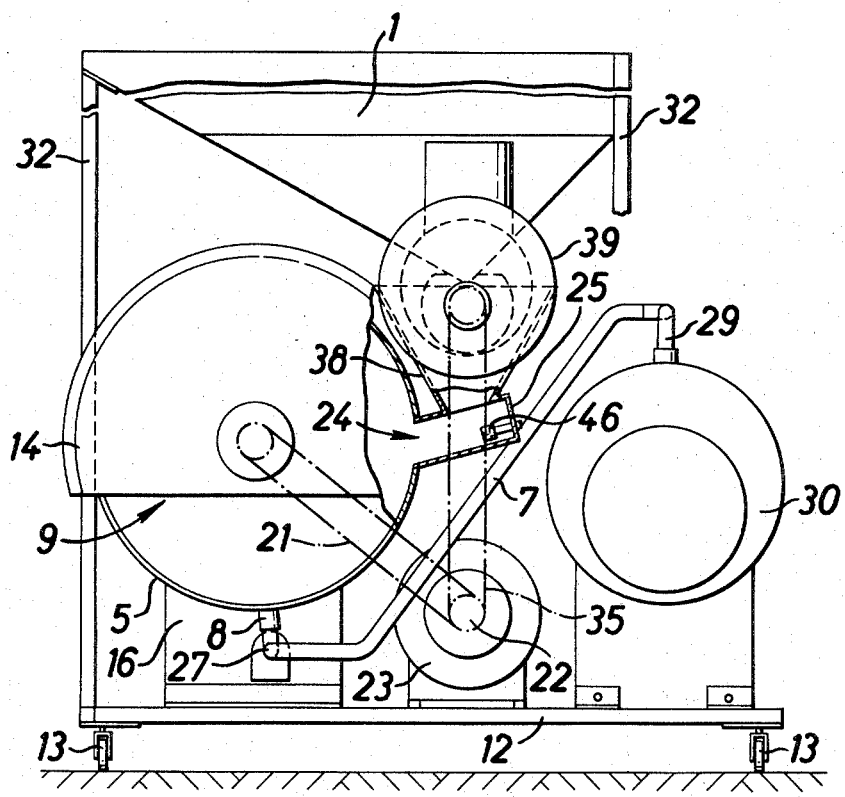
FIG. 4 is an end view as seen from the left of FIG. 2.

The apparatus can be used either for the continuous production of expanded material or for batch production. Further, the apparatus can be installed permanently on site or can be provided as a unitary structure capable of transportation. Such apparatus formed as a unitary structure is shown in FIGS. 2, 3 and 4 and in these Figures where possible, the same reference numerals are used to denote parts corresponding to FIG. 1.

The apparatus is mounted on a base indicated generally by reference numeral 12, the base being supported on castor wheels 13. The base consists for example of a rectangular frame constructed from angle iron, the frame being braced by bracing members extending between opposite sides of the frame. The cylinder 5, which is lagged with a suitable thermal insulating material, is mounted on the base so as to be offset to one side thereof the cylinder sloping at an angle to the horizontal. The cylinder is closed at each end by an end plate 14, 15, respectively and is supported on the base by brackets 16. The brackets 16 each extend upwardly from the base, the upper end of each bracket being secured to one of a corresponding number of rings 17 each of which embraces the cylinder 5, the brackets and the rings being correspondingly spaced lengthwise of the cylinder.

The conveying screw 6 disposed within the cylinder 5 has a shaft 18 rotatably mounted at each end in bearings 19, 20 on respectively the end plates 14, 15. The end of shaft 18 projects outwardly through the bearing 20 and is coupled by a chain drive 21 to the output shaft 22 of an electric motor and gear box unit 23 mounted on the base 12. The pitch and form of the flights of the conveying screw 6, and also their external diameter are such that the material is conveyed along an extended path from the inlet end of the cylinder to the outlet end thereof, the material being agitated during its passage through the cylinder. The material is delivered into the cylinder through an inlet opening 24 formed in the wall of the cylinder and at one side thereof adjacent the lower end of the cylinder the material being delivered to the opening through an inlet duct 25 projecting outwardly from the cylinder and into which the material to be expanded is fed by the metering device 2 hereinafter described. The material is fed along the cylinder by the conveyor screw 6 to the discharge opening 9 at the raised end of the cylinder, the discharge opening being in the underside of the cylinder and formed by a cut-away peripheral portion of the cylinder wall and end plate 14.

During its passage through the cylinder the material is expanded by steam supplied to the cylinder through the plurality of steam inlet pipes 8 spaced apart lengthwise of the cylinder and in the underside thereof. The inlet pipes 8 branch from a common duct 27 connected to the steam inlet pipe 7, connected to the main steam pipe 29 of a boiler 30 mounted on the base 12 to one side of the cylinder 5. Expanded material discharged from the cylinder 5 through the discharge opening 9 is delivered into the container 10 mounted on the base 12 so as to be disposed beneath the discharge opening 9.

The material to be expanded is fed into the first hopper 1 which is supported by a frame stucture 32 mounted on and extending upwardly from the base 12. The hopper 1 is mounted over the metering device 2 which consists of a barrel 33 containing the conveying screw 3, the screw having a shaft 34 which extends through the barrel one end of the shaft projecting out of the barrel the outer end of the shaft being coupled by a chain drive 35 to the output shaft 22 of the motor unit 23. The barrel 33 has an inlet opening in the wall thereof adjacent one end which communicates with an outlet opening in the base of the first hopper 1 the material fed into the barrel from the hopper being moved along the barrel by the conveying screw 3 to a discharge opening adjacent the opposite end of the barrel, the material from the discharge opening being delivered into the second hopper 4 which is disposed beneath the discharge opening in the barrel 33. The second hopper 4 is mounted on the inlet duct 25 and is open to said duct so that material in the hopper passes into the duct 25 for delivery into the cylinder 5.

Thus with the above described apparatus raw or unexpanded material fed into the first hopper 1, is delivered into the cylinder 5, expanded by heating as it moves through the cylinder, the expanded material discharged from the cylinder being collected in the container 10 from which it can be removed for use or for storage until required for use. The expanded material can also if desired, be recycled through the above described apparatus or through a separate and similar apparatus to effect a second expansion.

Thus the apparatus shown in FIGS. 2, 3 and 4 is adapted to permit recycling of the once-expanded material to be effected. For this purpose the apparatus is provided with a second metering device for supplying the once-expanded material to the inlet of the cylinder 5, the expanded material being conveyed along the cylinder by the conveying screw 6 for delivery to the container 10. The second metering device, indicated generally by reference numeral 39 is formed integral with the first metering device 2, and consists of a barrel 40 in which a feed screw 41 is disposed. The barrel 40 is mounted coaxially with the barrel 33 of the metering device 2 so that it forms an extension thereof. The shaft 34 of the metering device 2 is extended so that the same passes through barrel 40 the extension of the shaft carrying the conveying screw 41. The end of the barrel 40 remote from barrel 33 has an inlet duct 42 through which the material is supplied the material being conveyed through the barrel by the conveying screw 41 to a discharge outlet in the wall of the barrel and at the end thereof adjacent the barrel 33, the discharge outlet being disposed over the second hopper 4. As the once-expanded pieces of material are of larger size than the pieces of unexpanded material the barrel 40 is of larger diameter than the barrel 33, the conveying screw 41 being correspondingly larger than the conveying screw 3. Further, as conveying screws 41 and 3 are both on a common shaft the said screws are of opposite hand.

When carrying out the method of including a second expansion of the material, the once-expanded material is subjected to a period of dwell before being subjected to the second step. The once expanded-material can for example be retained in the container 10 for a predetermined period, air being blown into the container to agitate the material and assist in aeration of the same. For this purpose a blower 43 is mounted on the base 12, air from the blower being supplied to the base of the container through a supply pipe 44.

To assist the delivery of material through the inlet duct 25 into the cylinder 5, steam from the boiler can be injected into the duct, the steam being supplied through a pipe 45 branched off from the pipe 29 the pipe having a nozzle 46 disposed in the inlet duct 25. A valve 47 is provided in the pipe 44 so that the supply of steam can if required, be shut off. Advantageously, the cylinder 5, conveying screw 6 and other components subjected to corrosion arising from contact with the raw material are made from material resistant to corrosion. Fibre glass has been found to be particularly suitable for the production of the cylinder 5 and conveying screw 6.

The cylinder 5 can be disposed horizontally or vertically instead of at an angle to the horizontal as above described. Further the cylinder, when at an angle can be arranged so that the unexpanded or raw material is fed in at the raised end and discharged at the lower end of the cylinder. However, with the cylinder arranged as described with reference to the drawings, the material will be distributed more evenly in the cylinder as the same is moved in an upward direction by the conveying screw 6. The expansion of the material can be controlled by regulating the time taken for the same to be conveyed through the cylinder 5 and also by regulation of the temperature in the cylinder 5.

The method and apparatus of the present invention is particularly suitable for expanded material to be used as dunnage for packing purposes, for example as abovementioned, the dunnage material disclosed in the specification of Britich Patent No. 924,285. The material in the raw or unexpanded state is in the form of small pieces or beads each of which are considerably smaller than the pieces after expansion. For example the beads can be as small as 1/30 of the size of an expanded bead. Thus the dunnage material when bagged although comparatively light in weight is extremely bulky and accordingly requires considerable space for storage or for transportation from a supplier producing the expanded material to a user requiring the material for packing purposes. It is therefore of considerable advantage for the material to be supplied to a user in the raw or unexpanded state whereby the bulk would be considerably reduced. However as a user may require only limited supplies of the expanded material, it would be uneconomical for a user to have a large installation producing quantities of material in excess of his requirements. The apparatus of the present invention can however be made to suit the requirements of an individual user such apparatus being primarily used for batch production to meet the user's requirements. Thus the apparatus as described can be supplied to the user and installed at a suitable location in or in proximity to a packing department it being necessary only for the user to ensure that suitable points are available at the installation site for connecting the apparatus to any services required. For example with the apparatus above described a water supply would be required for the boiler, an electric supply for the motor and gear box unit and blower and preferably a drain.

In addition to advantages which will be apparent from the above description, the present apparatus has also the following advantages:

a. it enables a high polymer throughput rate to be obtained;

b. it is manoeuverable in or to a required site;

c. it is cheap to make, automatic in operation;

d. it is cheap to maintain;

e. it is simple to operate, for example because the conditions under which it operates are not critical;

f. it has a low steam consumption, and will work at a low steam pressure e.g. 5 p.s.i.;

g. it causes an agitating action during expansion, whereby the product is evenly treated and whereby undesirable adhesion between the pieces is eliminated;

h. it is fully inbuilt.

We claim:

1. Apparatus for expanding a multiplicity of pieces of expandable organic polymer comprising, a hollow cylinder formed with an inlet and an outlet, a conveying screw for conveying the pieces of polymer through the cylinder from the inlet to the outlet, means for supplying a heating fluid to the cylinder to heat it to a temperature sufficient to cause the expandable polymer to expand, a first metering device for feeding the pieces to the cylinder for effecting a first step of expansion, and a second metering device for feeding the expanded pieces to the cylinder for effecting a second step of expansion.

2. Apparatus according to claim 1 including means for generating the heating fluid and means connecting said generating means to the cylinder to supply the heating fluid to the cylinder at spaced intervals along the length thereof.

3. Apparatus according to claim 1 wherein the cylinder is disposed at an angle to the horizontal the inlet and outlet being disposed adjacent opposite ends of the cylinder.

4. Apparatus according to claim 3 wherein the outlet is disposed adjacent the raised end of the cylinder.

5. Apparatus according to claim 1 including a container disposed at the discharge end of the cylinder to receive expanded material from the cylinder and means for supplying air under pressure to said container.

6. Apparatus according to claim 1, wherein the first and second metering devices each comprise a cylindrical barrel containing a conveying screw, the barrel having an inlet and an outlet, each metering device being mounted adjacent the inlet end of the cylinder with the outlet of the cylindrical barrel in communication with the inlet of the cylinder, expanded material being conveyed along the cylindrical barrel from the inlet to the outlet thereof for supply to the cylinder.

7. Apparatus according to claim 6, wherein the first and second metering devices qre disposed end to end with their respective outlets arranged for delivery of material to the cylinder, the conveying screws of both metering devices being disposed on a common shaft and said conveying screws being of opposite hand.

8. Apparatus for expanding a multiplicity of pieces of expandable organic polymer comprising, a hollow cylinder formed with an inlet and an outlet, a conveying screw for conveying the pieces of polymer through the cylinder from the inlet to the outlet, means for supplying a heating fluid to the cylinder to heat it to a temperature sufficient to cause the expandable polymer to expand, a metering device for supplying unexpanded material to the cylinder, a further metering device for supplying expanded material to the cylinder, each said metering device having an inlet to receive material and an outlet for feeding material to the cylinder and means for conveying the material from the inlet of each said metering device to the outlet thereof, drive means for driving the conveying screw of the cylinder and the conveying means of each metering device, a container for receiving expanded material from the cylinder, means for supplying air under pressure to said container, and a wheeled base on which said cylinder, said means for supplying heating fluid to the cylinder, both said metering devices, said drive means and said container are mounted.

* * * * *